Patented Sept. 11, 1934

1,973,003

UNITED STATES PATENT OFFICE 1,973,003

DEHALOGENATION OF CYCLIC HALOGEN COMPOUNDS

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application July 8, 1930, Serial No. 466,577. In Germany July 12, 1929

17 Claims. (Cl. 260—37)

The present invention relates to the dehalogenation of cyclic halogen compounds, in particular halogenated vat dyestuffs.

We have found that cyclic organic halogen compounds, especially vat dyestuffs containing halogen, are partially or wholly dehalogenated in a simple manner which is easy to carry out industrially by treating them with agents having a reducing action in organic diluents in the presence of such metals any oxides of which are readily reduced to metals, or compounds of such metals. Agents having a reducing action which may be used for the purpose of the present invention, comprise, for example, hydrazine and its derivatives, hydroquinone, dioxindole, hydrazobenzene, glyoxal, guanidine, formamide, formic acid, alkali metal hydrosulphites and similar compounds. Agents of the aforesaid kind which are particularly suitable, are those as give off hydrogen, for example hydrazine, hydroquinone, dioxindole, hydrazobenzene, formic acid and alkali metal hydrosulphites. Metals and compounds thereof which may be employed are for example copper, nickel, iron, cobalt, silver and the other noble metals, their oxides and salts, for example their carbonates, acetates and the like, their halides and their complex compounds. Mostly it is advantageous to use the free metals, especially copper. Dehalogenation proceeds in a particularly smooth manner when the metals or metal compounds are used in stoichiometric proportions. It is often advantageous to add the reducing agent in portions at rather considerable intervals of time. The reaction is carried out in solvents or suspending agents and such as have basic properties as for example pyridine, the commercial mixture of pyridine bases, quinoline, collidine, dialkylaniline and the like are especially suitable as solvents or suspending agents, in particular such as are capable of dissolving the metal halide produced during reduction, such for example as copper halide, when copper has been used, such diluents being for instance pyridine or benzylcyanide or the like.

When dehalogenating the organic halogen compounds the whole of the halogen or only a part thereof is withdrawn from the halogen compounds according to the nature of the combination of the halogen, according to the amount of agents having a reducing action employed and according to the other reaction conditions. When dehalogenating halogen derivatives of anthraquinone or its derivatives the halogen in the α-position is preferentially eliminated. Dehalogenation is furthered by exposing the reaction mixture to the action of direct sunlight or rays of artificial ultraviolet light.

The reaction products which are obtained in almost quantitative yields may be used for various purposes, in part they are important intermediate products for the manufacture of vat dyestuffs and in part they are themselves valuable dyestuffs. They may be purified by known and suitable methods as for example by crystallization, and especially the dyestuffs, by purification by way of their oxonium salts, by sublimation or by treatment with oxidizing agents, for example with a solution of an alkali metal hypochlorite. The wholly or partially dehalogenated compounds which of great variety are obtainable by the process according to the present invention, dye the fibre in the most varied shades in so far as they are dyestuffs. The dyestuffs may also be used in the form of their leuco preparations, for example their leuco esters.

The following examples will further illustrate the nature of this invention but the invention is not restricted to these examples. The parts are by weight.

Example 1

42 parts of 4-Bz3-Bz5-trichloroanthraquinone-2.1(N)-benzacridone of the formula:

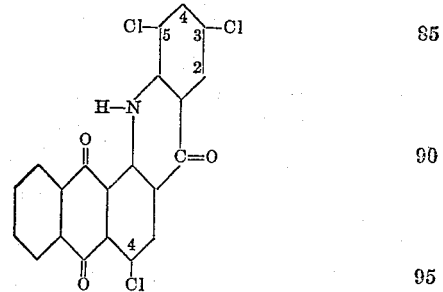

(prepared by condensation of 1-chloroanthraquinone with anthranilic acid, conversion of the condensation product into the corresponding acridone and further chlorination in nitrobenzene in the presence of iodine) in 210 parts of pyridine are heated to boiling while stirring after the addition of 2.75 parts of 90 per cent hydrazine hydrate and 4 parts of copper, until a sample taken out gives a pure red dyeing. The whole is then allowed to cool and is filtered by suction. The reaction product which is obtained in the form of red needles in a practically quantitative yield and which by analysis is a Bz3-Bz5-dichloroanthraquinone - 2.1(N) - benzacridone dissolves in concentrated sulphuric acid giving an orange colouration, gives a violet vat and dyes the vegetable fibre therefrom very fast clear red shades. The dyestuff may be freed from inorganic impurities by crystallization from nitrobenzene, or sulphuric acid, in the latter case by way of its oxonium salts or sulphuric acid salt, or by reprecipitation from its solution in acids or by treating its aqueous paste with a solution of an alkali or alkaline earth metal hypochlorite.

The reaction may be carried out in other solvents or suspending agents as for example in nitrobenzene or trichlorbenzene, in the presence of a copper compound or of metallic nickel with equal result.

Example 2

47 parts of dichloromonobromoanthraquinone-2.1(N)-benzacridone (prepared by treating 1 molecular proportion of the unhalogenated acridone in nitrobenzene with a little more than 1 molecular proportion of bromine and treating the product thus obtained with sulphuryl chloride in the presence of iodine) are suspended in 235 parts of pyridine and boiled while stirring after the addition of 3 parts of hydrazine hydrate and 2 parts of copper oxide until a sample taken out and dissolved in concentrated sulphuric acid gives a pure red flocculent precipitate when poured into water. The whole is then allowed to cool and is worked up in the usual manner. The reaction product, which is obtained in the form of blue red needles, and which by analysis is a Bz - monochloromonobromoanthraquinone - 2.1 - (N)-benzacridone, dissolves in concentrated sulphuric acid giving an orange colouration and gives red dyeings of very good fastness from a violet vat.

The reaction may also be carried out in the absence of pyridine or in the presence of quinoline, collidine or other organic bases or also in the presence of trichlorbenzene or nitrobenzene.

Example 3

36 parts of tetrabromopyranthrone in 1000 parts of pyridine are boiled while stirring after the addition of 5 parts of hydrazine hydrate, 5 parts of copper oxide and 10 parts of potassium carbonate until the reaction product dissolves readily in concentrated sulphuric acid. The whole is then allowed to cool, filtered by suction, and the reaction product freed from inorganic constituents by treatment with dilute mineral acid and dried. The reaction product obtained which according to analysis is a di-bromopyranthrone, crystallizes in the form of red orange needles, dissolves in concentrated sulphuric acid giving a blue colouration, gives a violet red vat and dyes the vegetable fibre orange red shades of very good fastness.

By the addition of less hydrazine hydrate a higher brominated reaction product is obtained, and by the addition of more hydrazine hydrate a reaction product containing less bromine or no bromine is obtained.

Example 4

40 parts of tetrabromodichlorodibenzanthrone, in 1000 parts of collidine are boiled while stirring after the addition of 10 parts of sodium acetate, 10 parts of hydrazine hydrate and 4 parts of copper sulphate until all the hydrazine hydrate is used up. The whole is then allowed to cool, the reaction product is filtered by suction and is separated from inorganic impurities in the usual manner. The reaction product, dibromodibenzanthrone, is a dark blue powder which dissolves is concentrated sulphuric acid giving a violet colouration, which gives a violet blue vat and which dyes cotton very fast marine blue shades.

In an analogous manner reaction products containing less halogen are obtained from polychloro-, for example pentachloro-, or polybromodibenzanthrones or the corresponding polyhalogen isodibenzanthrones.

Example 5

39 parts of 1.3-dibromo-2-aminoanthraquinone in 250 parts of quinoline are slowly heated to from 110° to 130° C. while stirring with 5 parts of copper amalgam, 17.5 parts of hydrazine sulphate and 8 parts of caustic potash and the temperature is kept constant until a sample taken out has a melting point of about 300° C. The whole is allowed to cool and the 2-amino-3-bromoanthraquinone formed is filtered by suction. It is in the form of orange red needles having a melting point of from 305° to 310° C.

2-amino-3-chloroanthraquinone is obtained in an analogous manner from 1.3-dichloro-2-aminoanthraquinone.

By adding more hydrazine sulphate and caustic potash and heating under pressure 2-aminoanthraquinone is obtained.

Example 6

60 parts of dibromobenzanthronepyrazolanthrone prepared by brominating benzanthronepyrazolanthrone in chlorosulphonic acid at 40° C. with the aid of iodine, in 720 parts of pyridine are boiled for several hours while stirring after the addition of 6 parts of finely divided pure copper, 10 parts potassium carbonate and 10 parts of hydrazine hydrate and filtered by suction while hot. The monobromobenzanthronepyrazolanthrone thus obtained in crystalline form dissolves in concentrated sulphuric acid giving a violet colouration and dyes cotton from a blue vat greenish marine blue shades of excellent fastness.

Chlorobenzanthronepyrazolanthrones or chlorobromo- or chloroiodo- or chlorobromoiodobenzanthronepyrazolanthrones as well as halogen-3.4.8.9-dibenzopyrene-5.10-quinones or halogen-4.5.8.9-dibenzopyrene-3.10-quinones may be dehalogenated according to the present invention in a similar manner. The aforesaid benzanthronepyrazolanthrones containing different halogens may be prepared by treating benzanthronepyrazolanthrones in acid solution, in particular sulphuric acid solution, with different halogens or agents supplying such halogens.

Example 7

80 parts of 9.10-dichloroanthracene-1.2.3.4-tetrachloride of the formula:

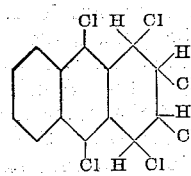

melting between about 205° and 207° C. are slowly heated to boiling while stirring in 240 parts of pyridine after the addition of 10 parts of copper powder and 10 parts of hydrazine hydrate, and kept boiling until a sample after crystallization from glacial acetic acid melts at about 209° C. The reaction mixture is then allowed to cool and the 9.10-dichloroanthracene formed filtered off.

Octobromocyclohexane obtainable by brominating cyclohexane in chlorosulphonic acid in the presence of iodine, forming colourless crystals melting between about 178° and 182° C., furnishes when heated to between 150° and 160° C. in a sealed tube with hydrazine hydrate and copper powder, a gaseous olefinic reaction product.

*Example 8*

46.3 parts of 4-Bz-2.3.4.5-pentachloroanthraquinone-2.1(N)-benzacridone (obtainable by condensation of 1.4-dichloroanthraquinone-2-carboxylic acid with 1-amino-2.3.4.5-tetrachlorobenzene and subsequent ring-closure to form the acridone) are slowly heated while stirring to between 90° and 100° C. in 200 parts of pyridine after the addition of 4 parts of copper powder and 2.5 parts of hydrazine hydrate. The reaction mixture is kept at the said temperature for from 1 to 2 hours, and then boiled for several hours, whereupon it is allowed to cool and the reaction product (a tetrachloro derivative according to analysis) obtained in the yield theoretically required filtered off. The product dissolves in concentrated sulphuric acid to give an orange solution and dyes cotton from a violet vat yellowish pink shades of excellent fastness against light and atmospheric influences.

When treating again the reaction product with hydrazine hydrate in the presence of copper or nickel powder a theoretical yield of a crystalline trichloro derivative is obtained, the properties of which (orange solution in concentrated sulphuric acid, violet vat, clear very fast orange red shades) correspond to those of Bz-3.4.5-trichloroanthraquinone-2.1(N)-benzacridone.

The dehalogenation of 4-Bz-2.3.4.5-pentachloroanthraquinone-2.1(N)-benzacridone to the Bz-3.4.5-trichloro derivative may also be carried out in a single working operation, for example by first heating to boiling the reaction mixture for several hours, allowing it to cool to between 70° and 80° C., and then heating again to boiling after the addition of from 3 to 4 parts of copper and 3 parts of hydrazine hydrate.

In an analogous manner from 4-Bz-2.3.4-tetrachloro-anthraquinone-2.1(N)-benzacridone first the 4-Bz-3.4-trichloro derivative and then the Bz-3.4-dichloro derivative, from 4-Bz-2.3.5-tetrachloroanthraquinone-2.1(N)-benzacridone first the 4-Bz-3.5-trichloro and then the Bz-3.5-dichloro derivative, from 4-Bz-2.3-trichloroanthraquinone-2.1(N)-benzacridone first the 4-Bz-3-dichloro and then the Bz-3-monochloro derivative may be obtained. In a similar manner from 4-bromo-Bz-2.3.4-trichloro-Bz-5-bromo-anthraquinone-2.1(N)-benzacridone first the 4-bromo-Bz-3.4-dichloro-Bz-5-bromoanthraquinone-2.1-(N)-benzacridone and then the Bz-3.4-dichloro-Bz-5-bromo derivative may be produced.

Bz-5-chloro-Bz-3-nitroanthraquinone-2.1(N)-benzacridone may be obtained by the action of hydrazine hydrate and copper powder in the presence of pyridine on 4-Bz-5-dichloro-Bz-3-nitroanthraquinone-2.1(N)-benzacridone (obtainable by the action of sulphuryl chloride on Bz-3-nitroanthraquinone-2-.1(N)-benzacridone in nitrobenzene at between 80° and 100° C.). In contradistinction thereto when treating 4-nitro-Bz-2.3.4-trichloroanthraquinone-2.1(N)-benzacridone in the same manner 4-amino-Bz-3.4-dichloroanthraquinone-2.1(N)-benzacridone is obtained, the latter being also produced by dehalogenation of 4-amino-Bz-2.3.4-trichloroanthraquinone-2.1(N)-benzacridone by means of hydrazine hydrate and a metal powder. In an analogous manner from 4-Bz-5-dichloro-Bz-3-aminoanthraquinone-2.1(N) - benzacridone the Bz - 5 - chloro - Bz-3-aminothraquinone-2.1(N) - benzacridone, and from 4-Bz-5-dichloro-Bz-3-methylanthraquinone - 2.1(N) - benzacridone the Bz-5-chloro-Bz-3-methylanthraquinone-2.1(N) - benzacridone is obtained.

The said reaction products may be purified according to known methods for example by recrystallization or by way of their oxonium salts or by extraction or by a treatment with oxidizing agents, such as for example by treating their aqueous paste with an alkali metal hypochlorite solution. They dissolve in concentrated sulphuric acid to give orange solutions, their vats are violet and the products free from nitro and amino groups dye the vegetable fibre generally speaking violet to orange shades, whereas the corresponding amino compounds yield in general more deeper, for example grey, blue or green shades.

*Example 9*

393 parts of Bz-2.3.4-trichloroanthraquinone-2.1(N)-benzacridone (obtainable by condensation of 1-chloroanthraquinone-2-carboxylic acid with 3.4.5-trichloroaniline and subsequent ring-closure to form the acridone) are slowly heated to boiling while stirring in 2000 parts of pyridine after the addition of 40 parts of copper powder and 35 parts of hydrazine hydrate of 90 percent strength. The reaction mixture is kept boiling until a sample furnishes bluish red shades in contradistinction to the yellowish red dyeing initial material. The reaction mixture is then allowed to cool and the product, a dichloro derivative according to analysis, filtered off. The yield is that theoretically required. The product is a crystalline red powder dissolving in concentrated sulphuric acid to give an orange solution and furnishes with an alkaline hydrosulphite solution a blue violet vat. It is the Bz-3.4-dichloro derivative. It exhibits very good tinctorial properties and is particularly suitable as printing dyestuff. The product differs from the dichloro derivative described in the U. S. Patent No. 1,010,930, since it does not loose any more chlorine under the conditions specified above, whereas the dichloro derivative described in the said U. S. patent which is Bz-2.3-dichloroanthraquinone-2.1(N) - benzacridone, is quantitatively converted into the Bz-3-monochloro derivative under the said conditions. Only when acting on Bz-3.4-dichloroanthraquinone-2.1(N)-benzacridone under decidedly stronger conditions, for example when working under increased pressure, a further chlorine atom is split off. A further difference between the said two dichloro derivatives consists in the Bz-3.4-dichloro derivative being quantitatively converted into 4 - Bz - 3.4.5 - tetrachloroanthraquinone-2.1(N)-benzacridone dyeing cotton brilliant yellowish pink shades by the action of chlorine in organic solvents in the presence of iodine, whereas the other dichloro derivative yields under equal conditions the isomeric 4-Bz-2.3.5-tetrachloro derivative dyeing weak blue red shades.

In an analogous manner from Bz-2.4-dichloroanthraquinone-2.1(N)-benzacridone the Bz-4-chloro derivative, from Bz-2.3-dichloroanthraquinone-2.1(N)-benzacridone the Bz-3-chloro derivative, from Bz-2.3.4.5-tetrachloroanthraquinone-2.1(N)-benzacridone the aforesaid Bz-3.4.5-trichloro derivative, from Bz-2.4-dichloro-Bz-3.5- dibromoanthraquinone-2.1(N)-benzacridone the Bz-4-chloro-Bz-3.5-dibromo derivative, from Bz-2.3.4 - trichloro - Bz - 5 - bromoanthraquinone-2.1(N)-benzacridone the Bz-3.4-dichloro-Bz-5-bromo derivative and from Bz-2-bromo-Bz-3.5-dichloroanthraquinone-2.1(N)-benzacridone the Bz-3.5-dichloro derivative described in Example 1 is obtained.

*Example 10*

36 parts of Bz-2-chloroanthraquinone-2.1(N)-benzacridone (obtainable by condensation of 1-chloroanthraquinone-2-carboxylic acid with m-chloroaniline and subsequent ring closure) are slowly heated to boiling while stirring in 150 parts of crude pyridine boiling between about 110° and 140° C. after the addition of 4 parts of copper bronze and 2.5 parts of hydrazine hydrate of 90 per cent strength. The reaction mixture is kept boiling until a sample is practically free from chlorine. The reaction mixture is then allowed to cool and the anthraquinone-2.1(N)-benzacridone separated in needles filtered off. Anthraquinone-2.1(N)-benzacridone is obtained in an analogous manner by treating Bz-3-chloroanthraquinone-2.1(N)-benzacridone with hydrazine hydrate under pressure in the presence of nickel carbonate or silver nitrate.

*Example 11*

328 parts of 3-bromo-2.1-pyridinoanthraquinone melting at about 239° C. are stirred at ordinary temperature for several hours in 1500 parts of crude pyridine after the addition of 30 parts of copper bronze and 15 parts of hydrazine hydrate of 90 per cent strength, the mixture being then slowly heated to 100° C., and as soon as a sample is practically free from bromine, the whole is heated to boiling for a short time, then allowed to cool and worked up as usual. The reaction product, a green yellow powder, crystallizes from glacial acetic acid in the form of green yellow needles melting between about 182 and 184° C. The properties of the product are identical with those of the known 2.1-pyridinoanthraquinone.

Monoamino-2.1-pyridinoanthraquinone is obtained in an analogous manner from mononitro-3-bromo-2.1-pyridinoanthraquinone.

Products free from bromine or having a lower content thereof are obtained by dehalogenation by means of hydrazine hydrate in the presence of metals, for example copper or palladium, from the dimethyldiimide of pentabromoperylenetetracarboxylic acid (obtainable by bromination of the said diimide in acid solution).

*Example 12*

27.1 parts of 2.4-dinitro-1.3.6-trichlorobenzene are stirred for a short time at ordinary temperature in 25 parts of pyridine to which 8 parts of copper bronze and 5 parts of hydrazine hydrate have been added. The reaction mixture becomes warm and is heated to boiling for a short time after the main reaction is finished and then worked up in the usual manner. The reaction product is a dark powder, crystallizing from water in straw yellow needles which deflagrate at about 345° C.

*Example 13*

20 parts of perchloronaphthalene having a chlorine content of 70.63 per cent are heated to boiling for a short time in 100 parts of pyridine after the addition of 8 parts of copper oxide and 10 parts of hydrazine hydrate and worked up as usual after cooling. The reaction product obtained in the form of yellow brown needles which according to analysis is a hexachloro derivative, crystallizes from monochlorobenzene in colourless needles melting at between about 202° and 204° C., whereas the mixture thereof with the initial material melting at between 192° and 193° C. is already liquid at 168° C.

*Example 14*

10 parts of hexabromo-8.8'-dihydroxydinaphthazine are warmed for several hours at between 90° and 100° C. in 100 parts of pyridine to which 2 parts of copper powder and 1 part of hydrazine hydrate have been added, the reaction mixture being then boiled up for a short time. After cooling the crystalline precipitate of tetrabromo-8.8'-dihydroxydinaphthazine is filtered off. The product dissolves in concentrated sulphuric acid to give a blue violet solution and furnishes red dyeings on cotton from an orange vat.

A red dyeing trichloro derivative is obtained in an analogous manner from octochloro-8.8'-dihydroxydinaphthazine.

*Example 15*

39.3 parts of 4-bromo-Bz-3.5-dichloroanthraquinone-2.1(N)-benzacridone are heated to boiling while stirring in 100 parts of pyridine after the addition of 4 parts of copper bronze and 15 parts of phenylhydrazine until a sample furnishes pure red dyeings. The reaction mixture is then allowed to cool and worked up as usual. The product is identical with that obtained according to Example 1.

A Bz-3.5-dibromo derivative dyeing blue red shades is obtained in an analogous manner from B-Bz-3.5-tribromoanthraquinone-2.1(N)-benzacridone.

Likewise Bz-3-chloro-Bz-5-bromoanthraquinone-2.1(N)-benzacridone dyeing bluish red shades is obtained by treating 4-Bz-5-dibromo-Bz-3-chloroanthraquinone - 2.1(N)-benzacridone (obtainable by brominating Bz-3-monochloroanthraquinone-2.1(N)-benzacridone in nitrobenzene in the presence of iodine) with hydrazine hydrate and copper powder in nitrobenzene, aniline or quinoline.

*Example 16*

1070 parts of 4-Bz-3.5-trichloroanthraquinone-2.1(N)-benzacridone are suspended in 5000 parts of a pyridine base of high boiling point and boiled while stirring for several hours after the addition of 100 parts of copper bronze and 300 parts of formic acid. When a sample furnishes pure red dyeings the reaction mixture is allowed to cool and the product, Bz-3.5-dichloroanthraquinone-2.1(N)-benzacridone, dissolves in concentrated sulphuric acid to give an orange solution and dyes cotton clear red shades of excellent fastness from a blue violet vat.

*Example 17*

42.8 parts of 4-Bz-3.5-trichloroanthraquinone-2.1(N)-benzacridone (obtainable by chlorinating anthraquinone-2.1(N)-benzacridone in nitrobenzene by means of sulphuryl chloride in the presence of iodine) are suspended in 210 parts of a pyridine base of high boiling point. After the addition of 4 parts of finely divided copper and 3.75 parts of dioxindole the temperature of the reaction mixture is raised to between 95° and 100° C., while stirring, and kept thereat for several hours, the temperature of the reaction mixture being then raised to boiling for a short time. The reaction mixture is then allowed to cool and a Bz-3.5-dichloro-2.1(N)-benzacridone is obtained in a pure condition and is filtered off in the form of red needles. The yield is practically that theoretically required.

The bluish red dyeing Bz-3.5-dibromoanthraquinone-2.1(N)-benzacridone is obtained in an analogous manner from 4-Bz-3.5-tribromoanthraquinone-2.1(N)-benzacridone obtainable by brominating anthraquinone-2.1(N)-benzacridone in nitrobenzene in the presence of iodine.

Equivalent amounts of hydroquinone, alkali metal hydrosulphite or hydrazobenzene may be used as reducing agents instead of dioxindole.

When starting from the tetrachloroanthraquinone-2.1-(N)-benzacridone (obtainable by chlorinating the trichloroanthraquinone-2.1(N)-benzacridone as above specified in chlorosulphonic acid in the presence of sulphur) first the red violet dyeing 4-Bz-3.5-trichloroanthraquinone-2.1(N)-benzacridone and then the red dyeing Bz-3.5-dichloroanthraquinone-2.1(N)-benzacridone are obtained in crystalline form in an analogous manner.

The copper may be replaced by an equivalent amount of nickel powder.

*Example 18*

72 parts of finely divided tetrabromopyranthrone are suspended, while stirring, in 500 parts of pyridine and slowly heated to 100° C. after the addition of 6.5 parts of copper bronze and 25 parts of sodium hydrosulphite. The reaction mixture is kept at the said temperature for several hours, allowed to cool after the reaction is complete which may be recognized by a sample after it has been dried, readily dissolves in concentrated sulphuric acid and readily furnishes a vat in contradistinction to the initial material. The reaction product is then recovered by filtration. It dyes cotton very fast orange shades from a violet vat.

2-amino-3-bromoanthraquinone is obtained in an analogous manner from 1.3-dibromo-2-aminoanthraquinone.

What we claim is:—

1. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in an inert organic solvent in the presence of a metal, any oxide of which is readily reduced to metal.

2. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in an inert organic solvent in the presence of an amount of a metal, any oxide of which is readily reduced to metal, which is equivalent to the amount of halogen to be eliminated.

3. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in an inert organic solvent in the presence of copper.

4. A process of dehalogenating cyclic halogen compounds, which comprises heating a halogen compound containing at least one aromatic ring and which may contain further aromatic and heterocyclic rings containing only nitrogen as the hetero atom with a strong reducing agent giving off hydrogen, in an inert organic solvent in the presence of an amount of copper equivalent to the amount of halogen to be eliminated.

5. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in an inert organic solvent having basic properties in the presence of a metal, any oxide of which is readily reduced to metal.

6. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in an inert organic solvent having basic properties in the presence of copper.

7. A process of dehalogenating cyclic halogen compounds, which comprises treating a halogen compound containing at least one aromatic ring and which may contain further aromatic and heterocyclic rings containing only nitrogen as the hetero atom with a strong reducing agent giving off hydrogen, in a pyridine base in the presence of a metal, any oxide of which is readily reduced to metal.

8. A process of dehalogenating cyclic halogen compounds, which comprises treating a halogen compound containing at least one aromatic ring and which may contain further aromatic and heterocyclic rings containing only nitrogen as the hetero atom with hydrazine, in an inert organic solvent having basic properties in the presence of copper.

9. A process of dehalogenating cyclic halogen compounds, which comprises treating a halogen compound containing at least one aromatic ring and which may contain further aromatic and heterocyclic rings containing only nitrogen as the hetero atom with hydrazine, in a pyridine base in the presence of copper.

10. A process of dehalogenating halogenated vat dyestuffs which comprises treating a halogenated vat dyestuff with a strong reducing agent giving off hydrogen, in an inert organic solvent in the presence of a metal, any oxide of which is readily reduced to metal.

11. A process of dehalogenating halogenated vat dyestuffs, which comprises treating a halogenated heterocyclic vat dyestuff containing only nitrogen as the hetero atom with a strong reducing agent giving off hydrogen, in an inert organic solvent in the presence of a metal, any oxide of which is readily reduced to metal.

12. A process of dehalogenating halogenated vat dyestuffs, which comprises treating a halogenated anthraquinone-acridone with a strong reducing agent giving off hydrogen, in an inert organic solvent in the presence of a metal, any oxide of which is readily reduced to metal.

13. A process of dehalogenating halogenated vat dyestuffs, which comprises treating a halogenated anthraquinone-2.1(N)-benzacridone containing halogen in at least one of the positions 4- and Bz2- with a strong reducing agent giving off hydrogen, in an inert organic solvent in the presence of a metal, any oxide of which is readily reduced to metal.

14. A process of dehalogenating halogenated vat dyestuffs, which comprises treating a halogenated anthraquinone-2.1(N)-benzacridone containing halogen in at least one of the positions 4- and Bz2- with a strong reducing agent giving off hydrogen, in an inert organic solvent in the presence of an amount of a metal, any oxide of which is readily reduced to metal, equivalent to the amount of halogen to be eliminated.

15. A process of dehalogenating halogenated vat dyestuffs, which comprises treating a Bz-2-halogenanthraquinone-2.1(N)-benzacridone with hydrazine in a pyridine base in the presence of copper.

16. A process of dehalogenating halogenated vat dyestuffs, which comprises treating a Bz-2-chloroanthraquinone-2.1(N)-benzacridone containing further halogen atoms with hydrazine in a pyridine base in the presence of copper.

17. A process of dehalogenating halogenated vat dyestuffs, which comprises treating Bz-2.3.4-trichloroanthraquinone-2.1(N)-benzacridone with hydrazine in a pyridine base in the presence of copper.

MAX ALBERT KUNZ.
KARL KOEBERLE.